US009516187B2

United States Patent
Mizutani

(10) Patent No.: US 9,516,187 B2
(45) Date of Patent: Dec. 6, 2016

(54) LASER SCANNING UNIT AND IMAGE FORMING APPARATUS INCLUDING THE SAME

(71) Applicant: KYOCERA Document Solutions Inc., Osaka-shi, Osaka (JP)

(72) Inventor: Hideji Mizutani, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/952,757

(22) Filed: Nov. 25, 2015

(65) Prior Publication Data

US 2016/0156802 A1    Jun. 2, 2016

(30) Foreign Application Priority Data

Nov. 27, 2014    (JP) .................................. 2014-240416

(51) Int. Cl.
| | |
|---|---|
| B41J 2/44 | (2006.01) |
| B41J 2/435 | (2006.01) |
| H04N 1/113 | (2006.01) |
| H04N 1/06 | (2006.01) |

(52) U.S. Cl.
CPC ................ H04N 1/113 (2013.01); H04N 1/06 (2013.01)

(58) Field of Classification Search
CPC ............. H04N 1/06; H04N 1/113; H04N 1/04
See application file for complete search history.

(56) References Cited

U.S. PATENT DOCUMENTS

| | | | | |
|---|---|---|---|---|
| 2008/0170283 A1* | 7/2008 | Imai | ..................... | G02B 26/123 359/204.1 |
| 2014/0009555 A1* | 1/2014 | Itami | ..................... | G02B 26/12 347/261 |

FOREIGN PATENT DOCUMENTS

| | | | |
|---|---|---|---|
| JP | 2006154337 A | | 6/2006 |
| JP | 2007086335 A | * | 4/2007 |

OTHER PUBLICATIONS

Ishii Kazuo, MachineTranslationofJP 2007086335 A, 2007.*

* cited by examiner

Primary Examiner — Geoffrey Mruk
Assistant Examiner — Scott A Richmond
(74) Attorney, Agent, or Firm — Alleman Hall McCoy Russell & Tuttle LLP

(57) ABSTRACT

A laser scanning unit includes a light source, a deflector, and a scanning lens. A surface shape of the scanning lens is formed so as to have: non-uniform-speed scanning characteristics in which a scanning speed with the light beam is the lowest at the one end and the other end of the to-be-scanned surface and is highest at a midpoint between the one end and the other end; and image formation characteristics in which a beam diameter of the light beam is largest at the one end and the other end of the to-be-scanned surface and is the smallest at the midpoint between the one end and the other end. The non-uniform-speed scanning characteristics and the image formation characteristics are characteristics in which a peak value of an intensity distribution of the light beam at each image height is made equal to each other by a combination of both characteristics.

4 Claims, 8 Drawing Sheets

LASER SCANNING UNIT AND IMAGE FORMING APPARATUS INCLUDING THE SAME

INCORPORATION BY REFERENCE

This application is based upon and claims the benefit of priority from the corresponding Japanese Patent Application No. 2014-240416 filed on Nov. 27, 2014, the entire contents of which are incorporated herein by reference.

BACKGROUND

The present disclosure relates to a laser scanning unit including a deflector which reflects a light beam emitted from a light source while oscillating about an oscillation axis, to perform deflection/scanning, and an image forming apparatus including the same.

Conventionally, some laser scanning units used in a laser printer, a copying machine, or the like use a Micro Electro Mechanical Systems (MEMS) mirror as a deflector which deflects a laser light beam emitted from a light source, to scan the circumferential surface of a photosensitive drum. The MEMS mirror has an oscillation axis perpendicular to a normal direction of the mirror, and is driven so as to oscillate about the oscillation axis in a reciprocating manner, thereby performing scanning in a predetermined scanning range on the photosensitive drum with the laser light beam.

A general MEMS mirror is oscillated sinusoidally. Thus, a scanning speed is the lowest at the end portions of the scanning range, and is the highest at the center portion of the scanning range. Due to this, a problem arises that the beam diameter of the laser light beam does not become uniform over all image heights in the scanning range. In order to realize uniform-speed scanning with a MEMS mirror which oscillates sinusoidally, it is necessary to use an arc sine lens as a scanning lens. Meanwhile, in order to make the beam diameter uniform over all the image heights, it is necessary to use an fθ lens as a scanning lens. However, the use of the arc sine lens achieves uniform-speed scanning but does not achieve uniformity of the beam diameter, and the use of the fθ lens achieves uniformity of the beam diameter but does not achieve uniform-speed scanning. That is, both uniform-speed scanning and uniformity of the beam diameter are not achieved at the same time.

A conventional laser scanning unit uses an arc sine lens as a scanning lens and controls a light emission time period and a light amount of a laser light beam, thereby ensuring uniformity of the beam diameter. Another conventional laser scanning unit uses an fθ lens as a scanning lens and controls light emission timing and a light emission time period of a laser light beam, thereby obtaining an effect corresponding to uniform-speed scanning. However, in order to realize these types of control, emission timing control with high accuracy, light amount control in a very wide range, and the like are required, and thus a problem arises that an emission control circuit becomes large in scale and expensive.

SUMMARY

A laser scanning unit according to one aspect of the present disclosure includes a light source, a deflector, and a scanning lens. The light source is configured to emit a light beam. The deflector has an oscillation axis and is configured to reflect the light beam emitted from the light source, while sinusoidally oscillating about the oscillation axis at a predetermined oscillation angle, to scan a region of a predetermined to-be-scanned surface from one end of the to-be-scanned surface to another end of the to-be-scanned surface with the light beam. The scanning lens is disposed between the deflector and the to-be-scanned surface and is configured to cause the light beam to form an image on the to-be-scanned surface. A surface shape of the scanning lens is formed so as to have: non-uniform-speed scanning characteristics in which a scanning speed with the light beam is the lowest at the one end and the other end of the to-be-scanned surface and is the highest at a midpoint between the one end and the other end; and image formation characteristics in which a beam diameter of the light beam is the largest at the one end and the other end of the to-be-scanned surface and is the smallest at the midpoint between the one end and the other end. The non-uniform-speed scanning characteristics and the image formation characteristics are characteristics in which, when scanning is performed with the light beam for a predetermined unit time period at a position of each image height on a scanning line from the one end of the to-be-scanned surface to the other end of the to-be-scanned surface, a peak value of an intensity distribution of the light beam at each image height is made equal to each other by a combination of both characteristics.

An image forming apparatus according to another aspect of the present disclosure includes: an image carrier configured to carry an electrostatic latent image; and the laser scanning unit configured to apply a light beam to a circumferential surface of the image carrier as the to-be-scanned surface.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3A is a graph showing a relationship between an image height and a light emission time period, and FIG. 3B is a graph showing a relationship between an image height and a light amount.

FIG. 4A is a graph showing an example of a beam profile in a main scanning cross-section, and FIGS. 4B and 4C are graphs each showing an example of an exposure intensity distribution.

DETAILED DESCRIPTION

Figure 1:
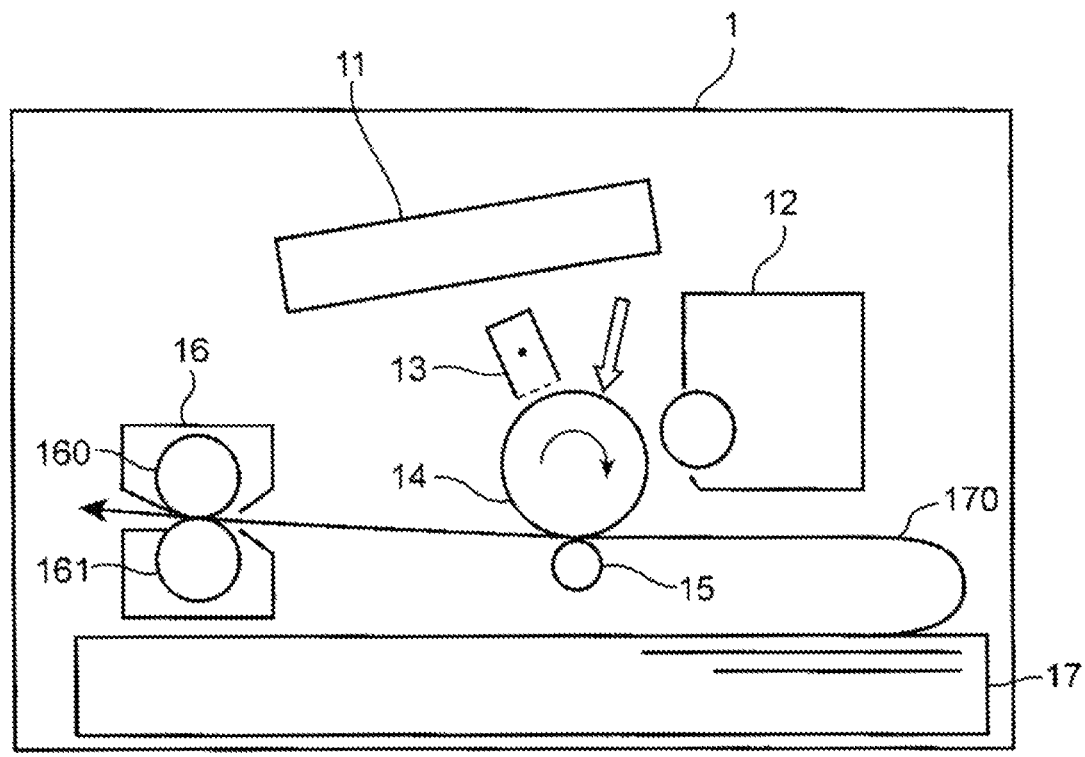
FIG. 1 is a cross-sectional view showing a schematic configuration of an image forming apparatus according to an embodiment of the present disclosure.

Hereinafter, a laser scanning unit according to an embodiment of the present disclosure will be described with reference to the drawings. FIG. 1 is a cross-sectional view schematically showing a configuration of an image forming apparatus 1 including a laser scanning unit 11 according to one embodiment of the present disclosure. The image forming apparatus 1 includes the laser scanning unit 11, a developing device 12, a charging device 13, a photosensitive drum 14 (image carrier), a transfer roller 15, a fixing device 16, and a sheet feed cassette 17.

The photosensitive drum 14 is a cylindrical member and carries an electrostatic latent image and a toner image on a circumferential surface thereof. The photosensitive drum 14 is driven by a driving force from a motor (not shown) to be rotated in a clockwise direction in FIG. 1. The charging device 13 substantially uniformly charges the surface of the photosensitive drum 14.

The laser scanning unit 11 includes a light source such as a laser diode, a deflector, a scanning lens, and an optical element, etc. The laser scanning unit 11 applies laser light according to image data, to the circumferential surface (to-be-scanned surface) of the photosensitive drum 14 that has been substantially uniformly charged by the charging device 13, thereby forming an electrostatic latent image of the image data. The laser scanning unit 11 will be described in detail later.

The developing device 12 supplies toner to the circumferential surface of the photosensitive drum 14 on which the electrostatic latent image has been formed, to form a toner image. The developing device 12 includes: a developing roller which carries the toner; and a screw which conveys the toner while agitating the toner. The toner image formed on the photosensitive drum 14 is transferred onto a recording sheet that is fed from the sheet feed cassette 17 and conveyed in a conveyance path 170. Toner is additionally supplied from a toner container (not shown) to the developing device 12.

The transfer roller 15 is disposed below the photosensitive drum 14 so as to be opposed to the photosensitive drum 14, and a transfer nip portion is formed between the photosensitive drum 14 and the transfer roller 15. The transfer roller 15 is formed from a rubber material or the like having electrical conductivity, and a transfer bias is applied to the transfer roller 15, whereby the transfer roller 15 transfers the toner image formed on the photosensitive drum 14, onto the recording sheet.

The fixing device 16 includes: a fixing roller 160 having a heater therein; and a pressure roller 161 provided at a position opposed to the pressure roller 161. The fixing device 16 conveys the recording sheet on which the toner image has been formed, while heating the recording sheet, thereby fixing the toner image formed on the recording sheet.

Next, an image forming operation of the image forming apparatus 1 will be briefly described. First, the surface of the photosensitive drum 14 is substantially uniformly charged by the charging device 13. The charged circumferential surface of the photosensitive drum 14 is exposed by the laser scanning unit 11, whereby an electrostatic latent image of an image to be formed on a recording sheet is formed on the surface of the photosensitive drum 14. This electrostatic latent image is made visible as a toner image by supplying the toner from the developing device 12 to the circumferential surface of the photosensitive drum 14. Meanwhile, a recording sheet is fed from the sheet feed cassette 17 to the conveyance path 170. The toner image is transferred onto the recording sheet when the recording sheet passes through the transfer nip portion between the transfer roller 15 and the photosensitive drum 14. After the transfer operation, the recording sheet is conveyed to the fixing device 16, and the toner image is fixed on the recording sheet.

Figure 2:
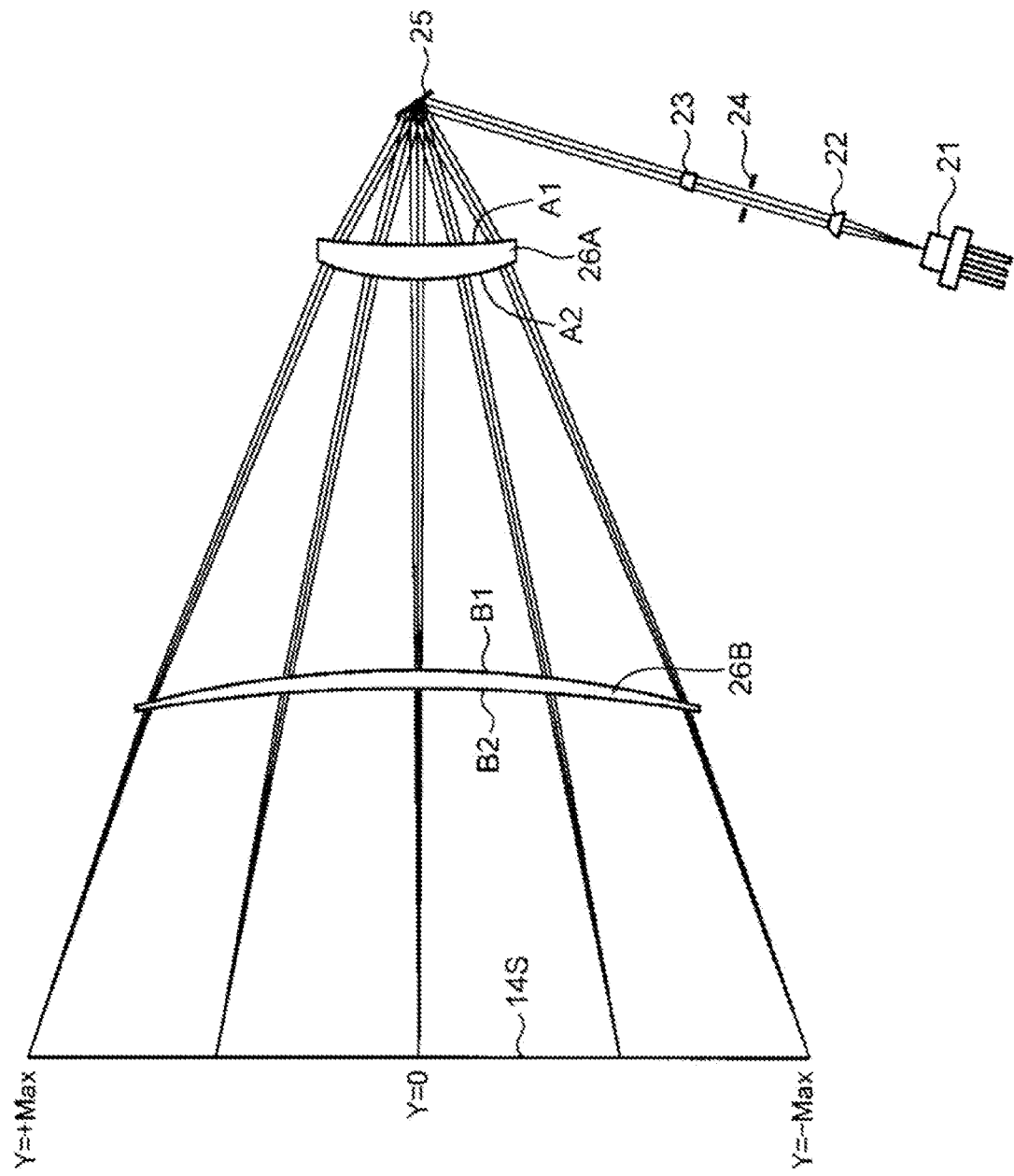
FIG. 2 is a plan view showing a configuration of a laser scanning unit in a main scanning cross-section.

Subsequently, the detailed structure of the laser scanning unit 11 will be described. FIG. 2 is a plan view showing a configuration of the laser scanning unit 11 in a main scanning cross-section. The laser scanning unit 11 includes a laser unit 21 (light source), a collimator lens 22, a cylindrical lens 23, an aperture 24, a MEMS mirror 25 (deflector), and a first scanning lens 26A and a second scanning lens 26B (scanning lens). Illustration of a housing holding these optical components, and the like is omitted in FIG. 2.

The laser unit 21 is a light source including a semiconductor light-emitting element which emits a laser beam having a predetermined wavelength (single wavelength). As the semiconductor light-emitting element, for example, a laser diode (LD) which emits a laser light beam having a single wavelength in the 670 nm band can be used. The laser unit 21 may be either a type emitting a single beam or a multi-beam type (monolithic LD) emitting a plurality of beams.

The collimator lens 22, the cylindrical lens 23, and the aperture 24 are disposed between the laser unit 21 and the MEMS mirror 25 on a light path. The collimator lens 22 converts the light beam that is emitted from the laser unit 21 and diffuses, into a parallel light beam. The cylindrical lens 23 converts the parallel light beam into linear light which is long in a main-scanning direction, and causes the linear light to form an image on the MEMS mirror 25.

The aperture 24 blocks part of the light beam that is emitted from the laser unit 21 and travels toward the MEMS mirror 25. The aperture 24 has an opening which shapes the light beam such that the beam diameter of the light beam to be applied to the circumferential surface 14S (to-be-scanned surface) of the photosensitive drum 14 has a desired size.

The MEMS mirror 25 has a mirror surface which reflects the light beam, and an oscillation axis parallel to a sub-scanning direction (a direction orthogonal to the drawing plane of FIG. 2). The MEMS mirror 25 reflects the light beam caused to from an image on the mirror surface, while sinusoidally oscillating about the oscillation axis in a reciprocating manner within the range of a predetermined oscillation angle, thereby performing scanning with the light beam from an end of a to-be-scanned region, which is set on the circumferential surface 14S of the photosensitive drum 14, to the other end of the to-be-scanned region.

The first scanning lens 26A and the second scanning lens 26B are lenses for causing the light beam, emitted from the laser unit 21, to form an image on and scan the circumferential surface 14S such that the lenses have predetermined image formation characteristics and scanning characteristics. The first scanning lens 26A and the second scanning lens 26B each have a lens surface composed of a free-form surface for realizing the above image formation characteristics and scanning characteristics. The first scanning lens 26A and the second scanning lens 26B are opposed to each other on an optical axis from the MEMS mirror 25 toward the circumferential surface 14S. Here, the scanning lens composed of two lenses is shown, but the scanning lens may be composed of a single lens or three or more lenses.

Although not shown in FIG. 2, a BD sensor is disposed outside an effective scanning region of the light beam (outside an image height y=+max and y=−max). Timing at which writing of a scanning line with the light beam is started is controlled on the basis of timing at which the light beam is detected by the BD sensor.

In the case of a scanning optical system using the MEMS mirror 25 as in the laser scanning unit 11 of the present embodiment, that is, in the case of a scanning optical system using, as a deflector, a MEMS mirror which deflects a light beam by sinusoidal oscillation, to cause the light beam to scan a to-be-scanned surface, both uniformity of the beam diameter of the light beam on an image surface (the circumferential surface 14S) and uniformity of a scanning speed on the image surface are not achieved at the same time. This is because a beam diameter D(y) at an image height y on the image surface is proportional to a value obtained by differentiating the image height y by a deflection angle θ, and a scanning speed v is a value obtained by differentiating the image height y by time t. The beam diameter D and the scanning speed v are represented by the following mathematical formulas.

$$D \propto \frac{dy}{d\theta}$$ [Math. 1]

$$v = \frac{dy}{dt} = \frac{dy}{d\theta}\frac{d\theta}{dt}$$

In order that the beam diameter D is uniform over the image heights, $dy/d\theta$ must not depend on the time t and the deflection angle θ. In addition, in the case where $dy/d\theta$ is independent from the time t and the deflection angle θ, in order that the scanning speed v is uniform, $d\theta/dt$ must not depend on the time t. However, a general MEMS mirror operates to sinusoidally oscillate and has scanning characteristics in which the scanning speed v is the highest around the center of the image height and is the lowest at each image height end portion. The operation is represented by the following formula. $\Theta_{max}$ denotes the maximum value (maximum deflection angle) which can be taken by the deflection angle θ.

$$\theta = \Theta_{max} \sin(2\pi vt)$$

As is obvious from the above formula, $d\theta/dt$ depends on the time t. Thus, both uniformity of the beam diameter and uniformity of the scanning speed are not achieved at the same time.

In order to make the beam diameter of the light beam uniform, it is necessary to use, as a scanning lens, an fθ lens having characteristics of:

$$y=f\theta.$$

On the other hand, in order to scan the to-be-scanned surface at a uniform speed while using sinusoidal oscillation of a MEMS mirror, it is necessary to use, as a scanning lens, an arc sine lens represented by:

$$y=\Theta_{max} \arcsin(\theta/\Theta_{max}).$$

Here, since both uniformity of the beam diameter and uniformity of the scanning speed are not achieved at the same time, uniform-speed scanning is achieved with a combination of the MEMS mirror and the arc sine lens, but the beam diameter varies. On the other hand, with a combination of the MEMS mirror and the fθ lens, a uniform beam diameter is obtained, but the scanning becomes non-uniform-speed scanning.

Figure 3A:
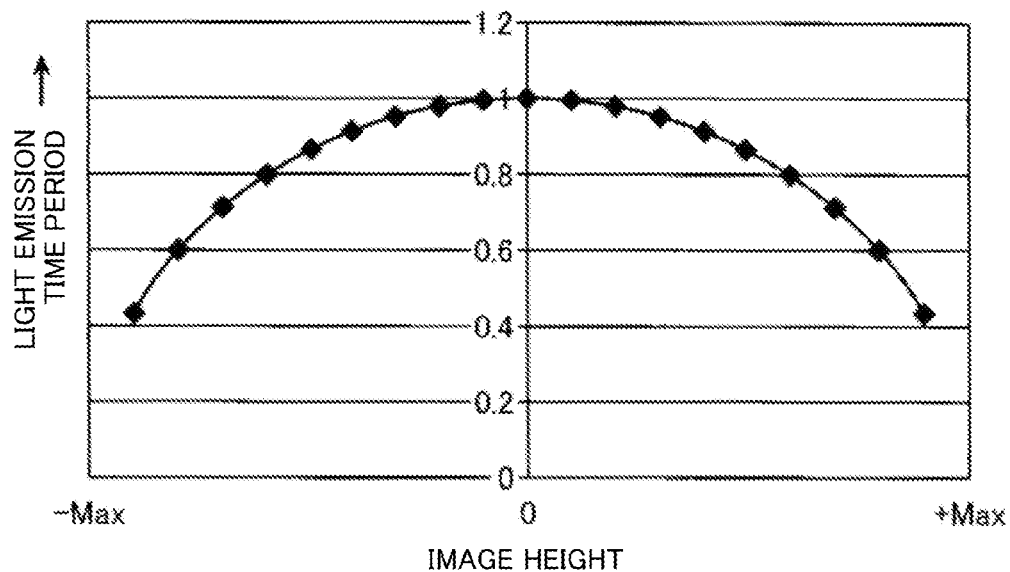
FIGS. 3A and 3B illustrate a comparative technique for the present disclosure.
Figure 3B:
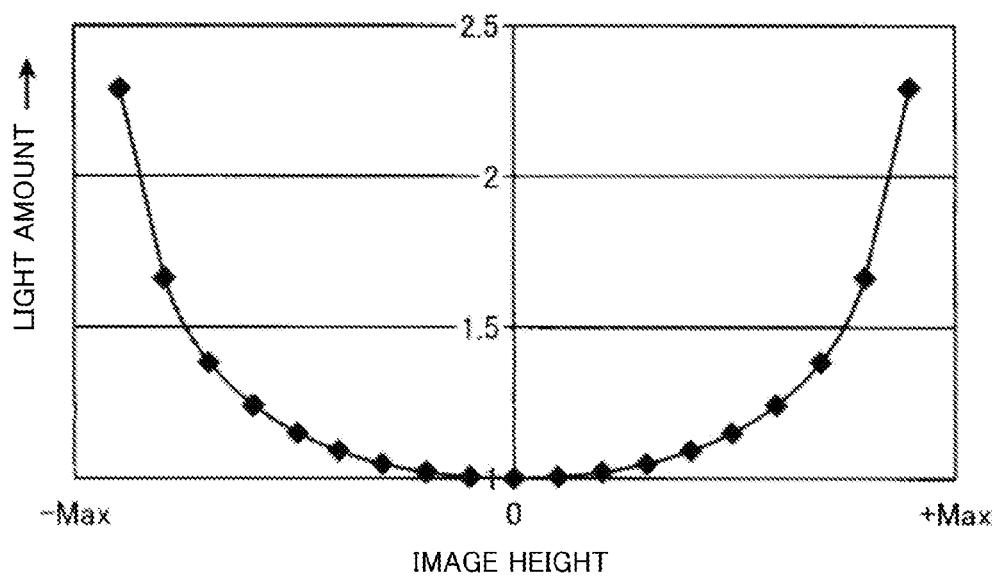

As a means for solving the above problem, there is a first comparative technique to suppress variation of the beam diameter by controlling light emission of a light source while using an arc sine lens as a scanning lens. In this embodiment, as shown in FIG. 3A, a light emission time period of the light source is shortened at the end portions (+max, −max) of the image height as compared to the center of the image height, thereby suppressing an increase in the beam diameter at the image height end portions. On the other hand, in order to compensate for exposure insufficiency caused due to shortening of the light emission time period, the light amount at the image height end portions is increased as shown in FIG. 3B.

By the above first comparative technique, uniformity of the beam diameter can be ensured over all image heights while uniform-speed scanning is realized by using the arc sine lens. However, in the above first comparative technique, two types of control for the light source, that is, control of the light emission time period and control of the light amount, are required in the range from the image height center to each image height end portion. In order to smoothly change the light emission time period over all the image heights, it is necessary to modulate a base clock, which sets the light emission time period, in accordance with the image height, or increase a clock frequency to change a light emission count number of the clock with respect to the image height. In order to realize these types of control, an expensive and complicated circuit is required. In addition, in order to change the light amount over all the image heights, there is a means for making the power of the light source variable, or changing the optical efficiency of an optical component such as a mirror in accordance with the image height. However, in order to change the light amount at levels in FIG. 3B, an expensive power control circuit is required, and a special structure is required also in the case where coating is adopted.

As another means for solving the above problem, there is a second comparative technique to correct a drawback of non-uniform-speed scanning by controlling light emission of the light source while using an fθ lens. The light emission control is control to change light emission timing and a light emission time period of the light source in accordance with the image height. Specifically, light emission timing of each pixel in a single scanning line is changed in accordance with the image height in consideration of magnification correction. In addition, the light emission time period is controlled such that the light emission time period is made longer with decreasing distance to the image height end portion. According to the second comparative technique, a light amount distribution of each pixel can be made uniform over all the image heights. However, also in the second comparative technique, it is necessary to control the light emission timing and the light emission time period of the light source over all the image heights, and thus there is a drawback that an expensive and complicated circuit is required.

Figure 4A:
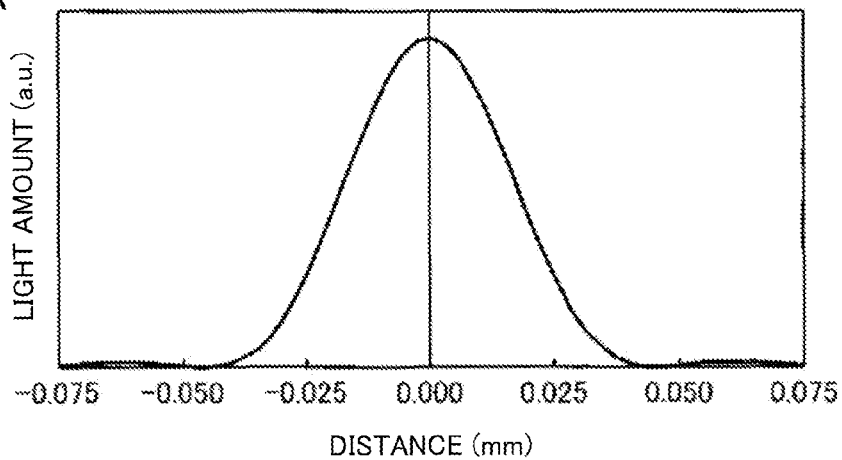
FIGS. 4A, 4B, and 4C illustrate a comparative technique for the present disclosure.

Furthermore, in the above first and second comparative techniques, a beam profile of the light beam also should be considered. FIG. 4A is a graph showing a beam profile, in a main scanning cross-section, of a light beam having a beam diameter of 60 μm in the main-scanning direction. The beam profile is a beam profile on the image surface when the MEMS mirror 25 stops at a certain deflection angle. The beam diameter is the width of a portion of the beam profile that has an intensity which is 13.5% ($1/e^2$) of the maximum light amount.

According to the second comparative technique, since the fθ lens is used, the beam diameter is uniform over all the image heights. Thus, the beam profile in a state where the MEMS mirror 25 stops also remains unchanged over all the image heights. However, in the above second comparative technique, the light emission time period is controlled such that the light emission time period is made longer with decreasing distance to the image height end portion. Therefore, when an exposure amount is compared, the exposure amount is different between at the image height center and at each image height end portion.

Figure 4B:
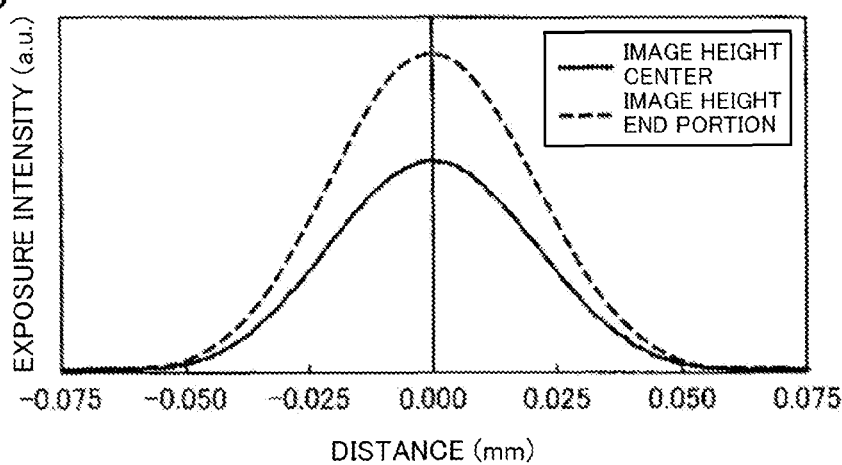
Figure 4C:
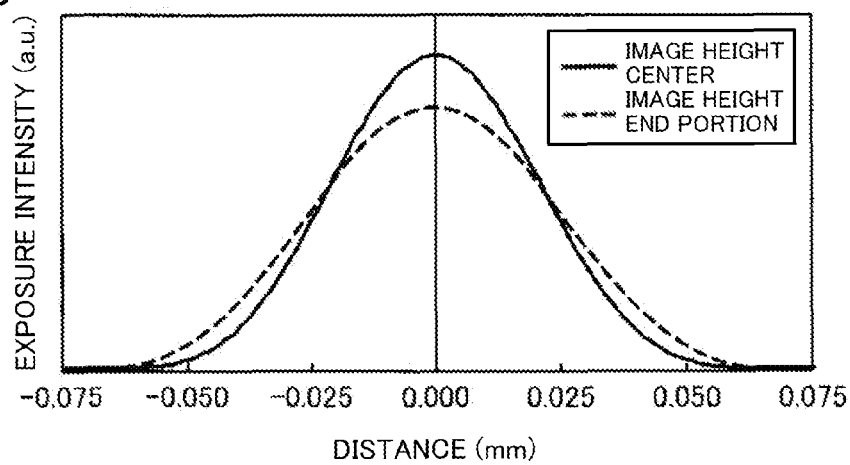

FIG. 4B is a graph showing an example of an exposure intensity distribution in the case where the light emission time period of the light source is made longer at each image height end portion by about 1.5 times than at the image height center. The exposure intensity distribution in this example is an exposure intensity distribution in the case where scanning is performed for 42.33 μm (for one pixel of 600 dpi) with a light beam having a beam diameter of 60 μm. Even when a beam profile is uniform, the exposure amount increases if the light emission time period becomes longer. Thus, the exposure amount is different between at the image height center and at each image height end portion, and this event causes exposure unevenness. In order to eliminate this problem, control to decrease the light amount at the image height end portion to adjust the exposure amount at the image height end portion to that at the image height center as shown in FIG. 4C is further required. Therefore, in the above second comparative technique, in addition to the control of the light emission timing and the light emission time period of the light source, control of the light amount is required, so that the control circuit is more complicated. In addition, in the above first comparative technique as well, control which takes uniformizing of the exposure amount into consideration is required, and thus a complicated control system is also required.

In consideration of the above, in the present embodiment, an exposure intensity distribution which is uniform over all the image heights is obtained by the lens characteristics of the scanning lens. That is, as either one or each of the first scanning lens 26A and the second scanning lens 26B, a lens having lens characteristics which are intermediate between the lens characteristics of the above-described fθ lens and the lens characteristics of the above-described arc sine lens is used to obtain a uniform exposure intensity distribution.

The above-described lens characteristics are achieved by the surface shapes of the first scanning lens 26A and the second scanning lens 26B. The surface shapes have specific non-uniform-speed scanning characteristics in the case where the light beam emitted from the laser unit 21 passes through the first scanning lens 26A and the second scanning lens 26B and scans the circumferential surface 14S of the photosensitive drum 14, which is the to-be-scanned surface, in the main-scanning direction with reference to FIG. 2. The non-uniform-speed scanning characteristics are characteristics in which a scanning speed in the main-scanning direction is the lowest at a + image height end portion (image height y=+max; one end of the to-be-scanned surface) and a − image height end portion (image height y=−max; the other end of the to-be-scanned surface) of the circumferential surface 14S, and is the highest at an image height center (image height y=0; the midpoint between the one end and the other end) of the circumferential surface 14S. The characteristics are characteristics which are exhibited when an fθ lens is used as a scanning lens.

In addition to the above non-uniform-speed scanning characteristics, the surface shapes are formed so as to have image formation characteristics in which the beam diameter of the light beam is the largest at the + image height end portion and the − image height end portion of the circumferential surface 14S and is the smallest at the image height center of the circumferential surface 14S. Such image formation characteristics are characteristics which are exhibited when an arc sine lens is used as a scanning lens.

In general, uniform-speed scanning characteristics are obtained by using a scanning lens having fθ characteristics, and image formation characteristics in which the beam diameter becomes uniform are obtained by using a scanning lens having arc sine characteristics. The surface shapes of the first scanning lens 26A and the second scanning lens 26B of the present embodiment are not formed for obtaining either one of uniform-speed scanning performance and uniformity of the beam diameter while the other thereof is compensated for by control through an electric circuit, and are formed as surface shapes with which non-uniform-speed scanning performance and non-uniformity of the beam diameter are intentionally exhibited, that is, as surface shapes having negative factors which are exhibited when an fθ lens and an arc sine lens are used.

In addition, the non-uniform-speed scanning characteristics and the image formation characteristics are set as characteristics in which, when scanning is performed with the light beam for a predetermined unit time period at each image height position on a scanning line in a single main scanning from the + image height end portion to the − image height end portion, the peak values of intensity distributions of the light beam at the respective image heights are made equal to each other by a combination of both characteristics. That is, the first scanning lens 26A and the second scanning lens 26B have a function to be able to make the peak values of the intensity distributions of the light beam equal to each other over all the image heights while having the lens characteristics which are intermediate between the characteristics of the fθ lens and the characteristics of the arc sine lens. Thus, in the laser scanning unit 11 having a scanning optical system using the MEMS mirror 25, the exposure intensity can be made uniform over all the image heights without using a large-scale light emission control circuit or the like. Therefore, the image forming apparatus 1 is able to perform high-quality image formation without image defects such as density unevenness.

The above phrase "the peak values of the intensity distributions of the light beams are equal to each other over all the image heights" does not mean that the peak values strictly coincide with each other, and include a range where the peak values can be considered substantially equal to each other. An allowable range where the peak values are considered substantially equal to each other is about ±5% and preferably equal to or less than ±2%, relative to the peak value of an intensity distribution which is a reference. Even if such variations are present, an exposure intensity distribution at a level where no image defect substantially occurs can be obtained. The reference peak value is the peak value at a specific image height (e.g., y=0) or the average of the peak values at all the image heights.

The above predetermined unit time period is desirably a time period for which scanning is performed for a length corresponding to one pixel of an electrostatic latent image to be drawn at the image height center. For example, in the case with a resolution of 600 dpi, the unit time period is a time period required to scan the circumferential surface 14S for a distance of 42.33 μm. The light beam emitted from the light source is switched ON/OFF in unit of one pixel. Therefore, by setting the unit time period to be a scanning time period for one pixel, the exposure amount can be easily adjusted.

Here, the opening diameter of the aperture 24, particularly, the opening diameter in the main-scanning direction, affects the lens characteristics of each of the first scanning lens 26A and the second scanning lens 26B. This is because the magnitude of the opening diameter of the aperture 24 determines the magnitude of the beam diameter of a beam spot formed by the light beam on the circumferential surface 14S through the first scanning lens 26A and the second scanning lens 26B. Therefore, the opening diameter of the aperture 24 is set in such a shape that a light beam of a beam diameter with which the first scanning lens 26A and the second scanning lens 26B exert the non-uniform-speed scanning characteristics and the image formation characteristics is formed on the circumferential surface 14S. By appropriately adjusting the beam diameter with the aperture 24, the desired non-uniform-speed scanning characteristics and the desired image formation characteristics, that is, characteristics in which uniformity of the exposure intensity distribution is more excellent, can be easily and assuredly created.

Subsequently, a specific example which meets the requirements of the embodiment described above will be shown. A scanning optical system of the example has a configuration in which the one collimator lens 22, the aperture 24, the one cylindrical lens 23, the MEMS mirror 25, the first scanning lens 26A, and the second scanning lens 26B are disposed in order from the laser unit 21 side as shown in FIG. 2. Here, in FIG. 2, the direction in which the light beam travels is defined as a z direction, the main-scanning direction is defined as a y direction, and the direction perpendicular to the drawing plane of FIG. 2 (the sub-scanning direction) is defined as an x direction. In such a local orthogonal coordinate system (x, y, z), each of the shapes of yz cross-sections of the first scanning lens 26A and the second scanning lens 26B is defined as a free-form surface represented by the following mathematical formula indicating a sag amount. In the following formula, Ry is a main-scanning curvature radius, K is a main-scanning conic coefficient, and $A_{2i}$ is a higher-order coefficient of the surface shape.

$$z = \frac{y^2/R_y}{1+\sqrt{1-(1+K)(y/R_y)^2}} + \sum_{i=2} A_{2i} y^{2i}$$ [Math. 2]

Table 1 shows the coefficient of each of the lens surfaces of the first scanning lens 26A and the second scanning lens 26B according to the present example. In addition, Table 2 shows distances between lens surfaces in the scanning optical system of the present example. As shown also in FIG. 2, in Tables 1 and 2, a lens A1 is an incident surface (a surface at the MEMS mirror 25 side) of the first scanning lens 26A, and a lens A2 is an exit surface (a surface at the circumferential surface 14S side) of the first scanning lens 26A. In addition, a lens B1 is an incident surface of the second scanning lens 26B, and a lens B2 is an exit surface of the second scanning lens 26B.

TABLE 1

|     | Lens A_1 | Lens A_2 | Lens B_1  | Lens B_2 |
|-----|----------|----------|-----------|----------|
| Ry  | 174.109  | 69.172   | −358.409  | −500.000 |
| K   | −56.779  | −4.157   | 0         | 0        |
| A4  | 7.833E−08| 6.178E−07| −4.317E−08| 0        |
| A6  | 0        | 0        | 6.181E−12 | 0        |
| A8  | 0        | 0        | −4.684E−16| 0        |
| A10 | 0        | 0        | 1.816E−20 | 0        |
| Rx  | −45.713  | ∞        | −65.659   | 70.724   |

TABLE 2

| (mm) | Surface interval |
|---|---|
| MEMS-lens A_1 | 40.000 |
| Lens A_1-lens A_2 | 10.000 |
| Lens A_2-lens B_1 | 110.715 |
| Lens B_1-lens B_2 | 5.000 |
| Lens B_2-to-be-scanned surface | 104.069 |

In Table 1, Rx is a sub-scanning curvature radius which represents the curvature radius of the shape of an xz cross-section of the scanning lens on the optical axis. The curvature radius is changed in order to keep magnification and aberration favorable by the image height, but a coefficient for the change is omitted here. Each of the refractive indexes of the first scanning lens 26A and the second scanning lens 26B is 1.50628. Table 2 shows each inter-surface distance on the optical axis from the MEMS mirror 25 to the circumferential surface 14S which is the to-be-scanned surface.

In the scanning optical system of the example, as the MEMS mirror 25, one which has a maximum oscillation angle of 25 degrees and sinusoidally oscillates in constant cycles is used, and the MEMS mirror 25 is mounted to the housing such that a reflected light beam travels toward the image height center at an oscillation angle of 0 degree. In this case, the reflection deflection angle of the light beam sinusoidally oscillates in a range of ±50 degrees. In this scanning optical system, the image height at the + image height end portion (y=+max) is +110 mm, and the image height at the − image height end portion (y=−max) is −110 mm.

Figure 5A:
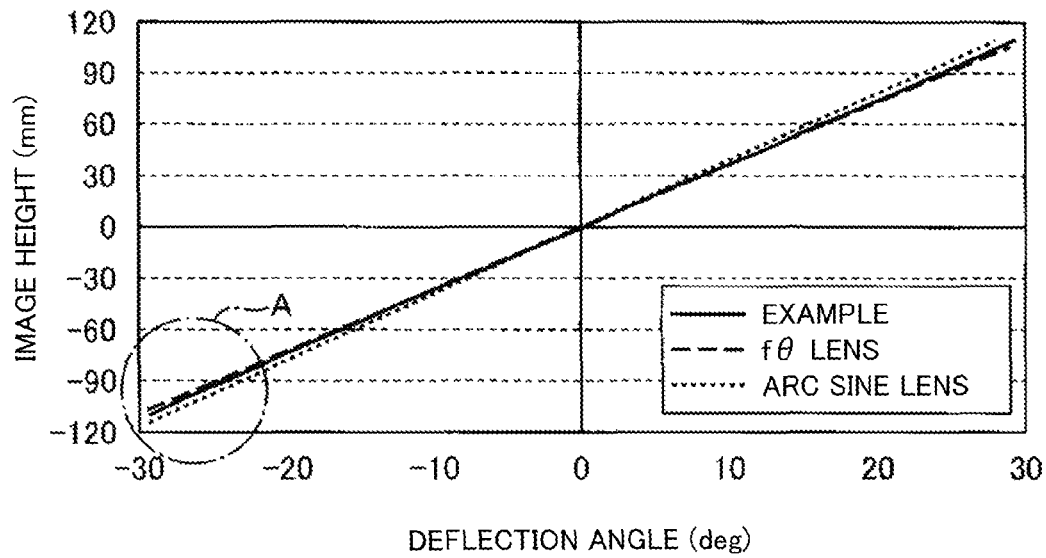
FIG. 5A is a graph showing a relationship between a deflection angle of a MEMS mirror and an image height at which a light beam is converged, in each of scanning optical systems according to an example and comparative examples.
Figure 5B:
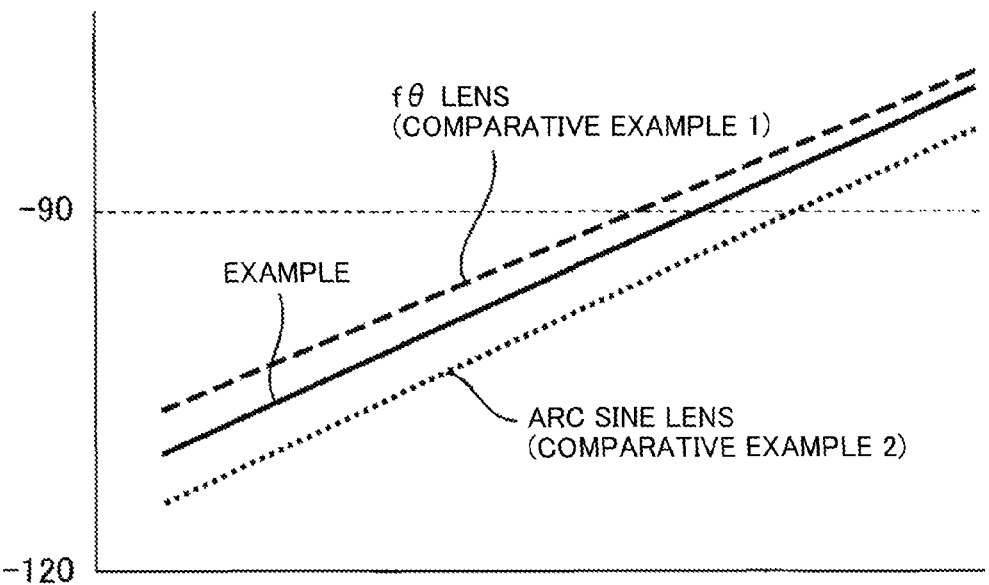
FIG. 5B is an enlarged view of a portion in a circle A indicated by an alternate long and short dash line in FIG. 5A.

In each of graphs in FIGS. 5A and 5B, "EXAMPLE" shows data of the scanning optical system in the above Tables 1 and 2. In addition, "fθ LENS (COMPARATIVE EXAMPLE 1)" shows data of a scanning optical system in which an ideal fθ lens having the same focal distance as in the example is used as the first scanning lens 26A and the second scanning lens 26B, and "ARC SINE LENS (COMPARATIVE EXAMPLE 2)" shows data of a scanning optical system in which an ideal arc sine lens having the same focal distance as in the example is used as the first scanning lens 26A and the second scanning lens 26B. As is obvious from FIGS. 5A and 5B, the three types of lenses have the same characteristics near the image height center, but the characteristics thereof are separated from each other toward each image height end portion.

Figure 6:
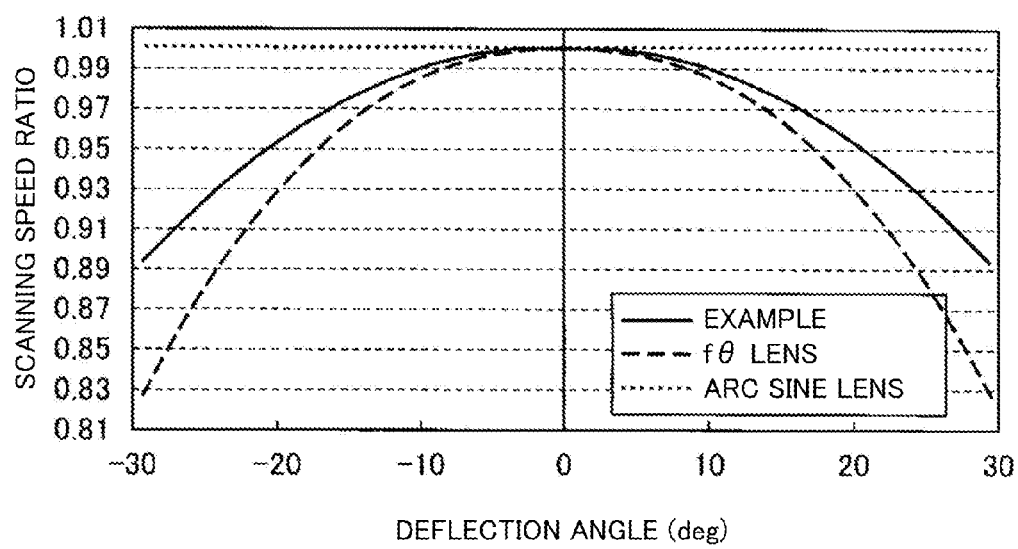
FIG. 6 is a graph showing a relationship between the deflection angle of the MEMS mirror and a scanning speed ratio, in each of the scanning optical systems according to the example and the comparative examples.

FIG. 6 is a graph showing a relationship between the deflection angle of the light beam by the MEMS mirror 25 and a scanning speed ratio in each of the scanning optical systems according to the example and the comparative examples. In FIG. 6, the scanning speed at the image height center on the to-be-scanned surface is defined as 1, and the scanning speed at another image height is indicated as a ratio relative to the scanning speed at the image height center. As already described, uniform-speed scanning characteristics can be obtained when an arc sine lens is used. Here, in Comparative Example 2, since the ideal arc sine lens is used, the scanning speed ratio is constant as 1 over all the image heights. On the other hand, in the example or with the fθ lens (Comparative Example 1), the scanning speed decreases at each image height end portion. The example exhibits non-uniform-speed scanning characteristics, but it is recognized that the degree of the decrease in the scanning speed at each image height end portion is lower than that with the fθ lens.

Figure 7:
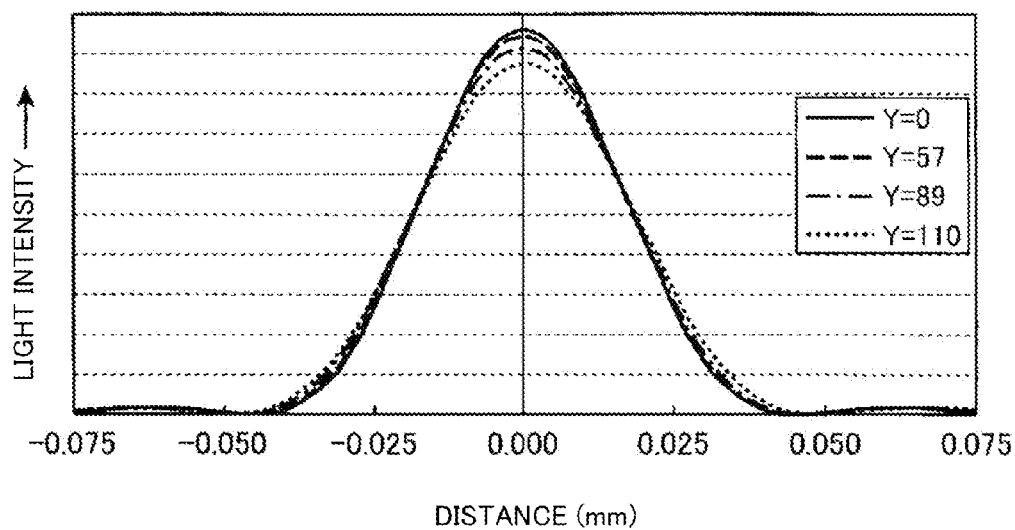
FIG. 7 is a graph showing a beam profile in a main scanning cross-section at each image height in the scanning optical system according to the example.

FIG. 7 is a graph showing a beam profile in a main scanning cross-section at each image height (y=0 mm, y=57 mm, y=89 mm, y=110 mm) in the scanning optical system according to the example. The beam diameter (beam profile) of the light beam is affected by not only the focal distance of the scanning lens but also the wavelength of the light beam and the opening diameter of the aperture 24. Here, the wavelength of the light beam emitted from the laser unit 21 is set as 670 nm, and the opening length of the aperture 24 in the main-scanning direction is set as 3.79 mm.

Figure 8:
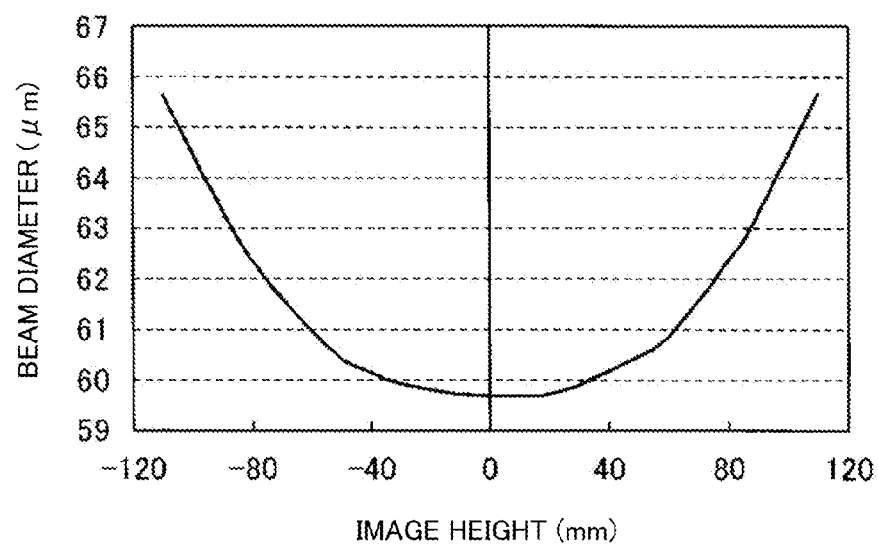
FIG. 8 is a graph showing a relationship between an image height and a main-scanning beam diameter in the scanning optical system according to the example.

FIG. 8 is a graph showing a relationship between an image height and a main-scanning beam diameter in the scanning optical system according to the example. As already described, uniformity of the beam diameter can be obtained when an fθ lens is used, but in the scanning optical system of the example, the beam diameter increases from the image height center toward each image height end portion. The reason why the peak height of the beam profile gradually decreases in order of image height y=0 mm, y=57 mm, y=89 mm, and y=110 mm in FIG. 7 is that the beam diameter changes as shown in FIG. 8. Although not shown in FIG. 8, with the fθ lens (Comparative Example 1), the beam diameter is uniform over all the image heights, and with the arc sine lens (Comparative Example 2), the beam diameter increases from the image height center toward each image height end portion, similarly as in the example.

Figure 9:
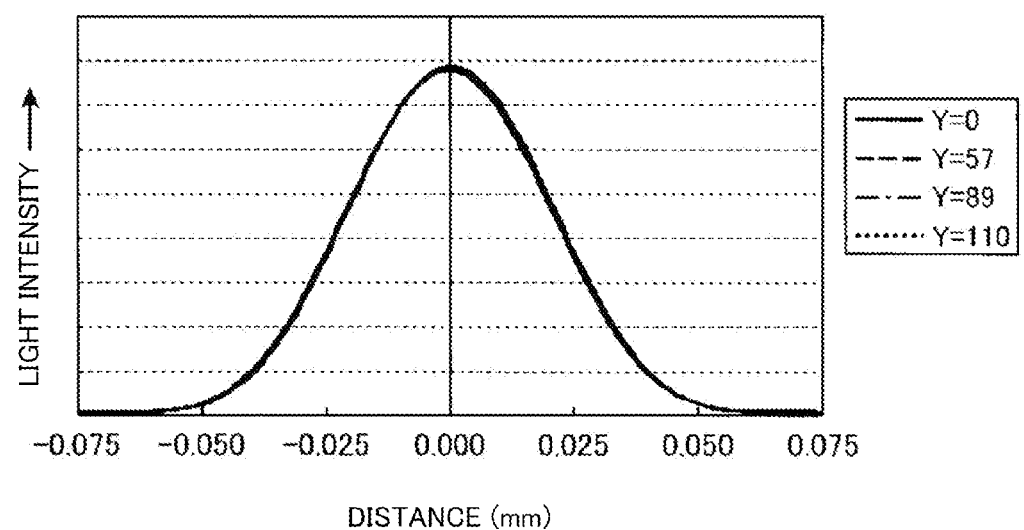
FIG. 9 is a graph showing exposure intensity at each image height in the scanning optical system according to the example.

FIG. 9 is a graph showing exposure intensity at each image height in the scanning optical system according to the example. The exposure intensity distributions shown in FIG. 9 are exposure intensity distributions which are formed at image height y=0 mm, y=57 mm, y=89 mm, and y=110 mm, respectively, when a time period required to perform scanning for 42.33 μm (for one pixel of a resolution of 600 dpi) at the image height center is defined as T0 and scanning is performed for the scanning time period T0 at the respective image heights with the light beam having the beam profile variation characteristics in FIG. 7. As shown in FIG. 9, the exposure intensity distributions at the respective image heights overlap each other, and almost no difference is recognized between the shapes of the exposure intensity distributions. When the magnitude of the peak value of the exposure intensity distribution at image height y=0 mm is defined as 1, the peak value at y=57 mm is 1.0019, the peak value at y=89 mm is 1.0021, the peak value at y=110 mm is 0.9893, and the variation falls within ±2%.

The factor that the exposure intensity distributions at the respective image heights are equal to each other as described above is that the non-uniform-speed scanning characteristics of the first scanning lens 26A and the second scanning lens 26B and the image formation characteristics in which the beam diameter varies complement each other (both characteristics are combined). That is, in the present example, since, at each image height, the scanning speed gradually decreases from the image height center toward each image height end portion as shown in FIG. 6, the scanning distance is shorter at each image height end portion even with the same scanning time period T0. Thus, on one scanning line, the intensity of applied light per unit area is higher at each image height end portion than at the image height center. This leads to compensation for the expansion of the beam profile toward each image height end portion as shown in FIG. 7 (that is, the decrease in the peak of the beam profile) due to the increase in the beam diameter toward each image height end portion as shown in FIG. 8. Due to such a mechanism, the peak values of the intensity distributions of the light beam at the respective image heights can be made equal to each other. According to the scanning optical system of the present example, the exposure intensity distributions are equal to each other over all the image heights, thus an electrostatic latent image drawn on the circumferential surface 14S becomes uniform in quality, and development unevenness does not occur.

Figure 10:
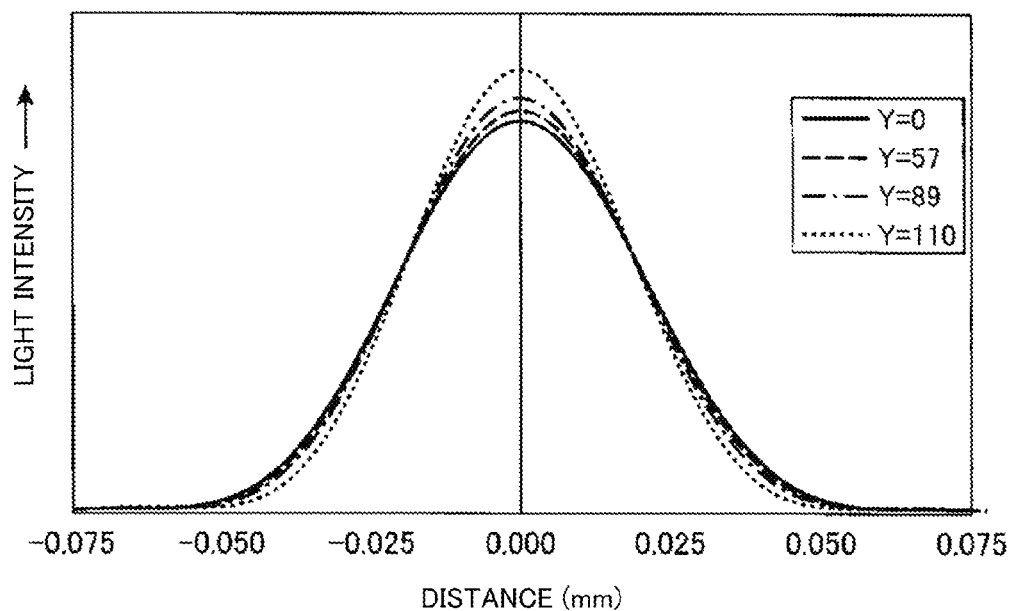
FIG. 10 is a graph showing exposure intensity at each image height in the scanning optical system according to Comparative Example 1.

FIG. 10 is a graph showing exposure intensity at each image height in the scanning optical system according to Comparative Example 1 in which the fθ lens is used. In Comparative Example 1, the peak value of the exposure intensity distribution increases from the image height center toward each image height end portion. This is because, in the case with the fθ lens, the beam diameter is kept uniform and thus an exposure amount increases at each image height end portion due to a decrease in the scanning speed. In Comparative Example 1, when the magnitude of the peak value of the exposure intensity distribution at image height y=0 mm is defined as 1, the peak value at y=57 mm is 1.0207, the peak value at y=89 mm is 1.0602, the peak value at y=110 mm is 1.1227, and the variation exceeds 10%.

Figure 11:
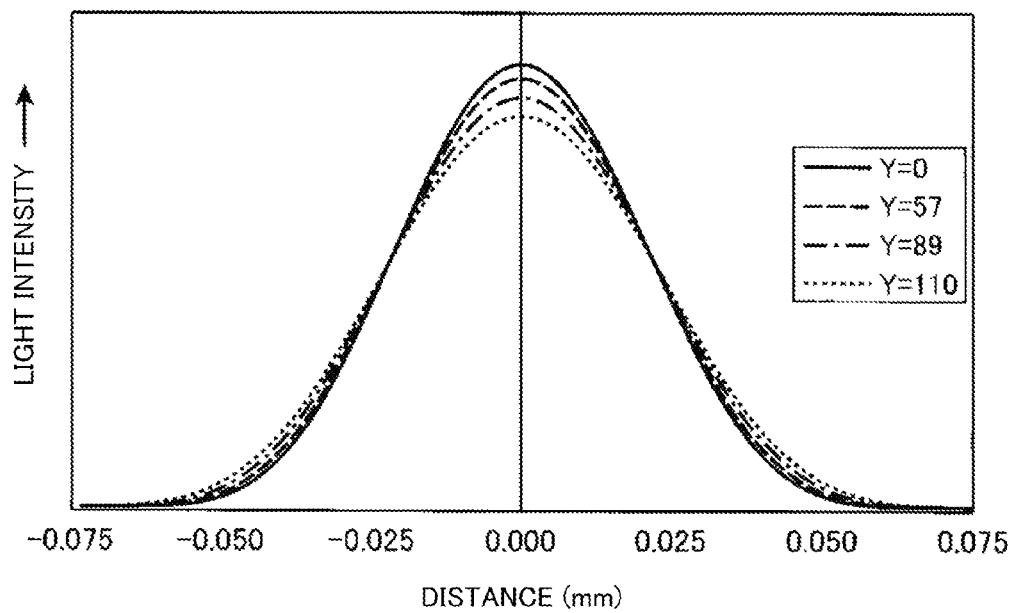
FIG. 11 is a graph showing exposure intensity at each image height in the scanning optical system according to Comparative Example 2.

FIG. 11 is a graph showing exposure intensity at each image height in the scanning optical system according to Comparative Example 2 in which the arc sine lens is used. In Comparative Example 2, contrary to Comparative Example 1, the peak value of the exposure intensity distribution decreases from the image height center toward each image height end portion. This is because, in the case with the arc sine lens, scanning is performed at a uniform speed and thus an exposure amount decreases at each image height end portion due to a decrease in the peak value of the beam profile. In Comparative Example 2, when the magnitude of the peak value of the exposure intensity distribution at image height y=0 mm is defined as 1, the peak value at y=57 mm is 0.9681, the peak value at y=89 mm is 0.9265, the peak value at y=110 mm is 0.8854, and the variation exceeds 10%.

As described above, with the laser scanning unit 11 according to the present embodiment, the exposure amount can be uniform over all the image heights without making the control system into a large-scale one. Therefore, the image forming apparatus 1 is able to perform high-quality image formation without density unevenness.

The present disclosure is not limited to the above-described embodiment, and various modifications can be made. For example, in the above-described embodiment, the method in which the exposure intensity distribution is made uniform by the surface shapes of the first scanning lens 26A and the second scanning lens 26B has been illustrated, but control of the light source may be used in combination according to need. Depending on a scanning optical system, an ambient light amount may decrease. If the light amount changes, the intensity distribution does not become uniform. In such a case, the exposure intensity distribution can be made uniform by performing correction for the ambient light amount ratio by a conventionally known method. In this case, since the correction is performed only for the ambient light amount ratio (about 10%), favorable correction can be performed by a low-cost method.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A laser scanning unit comprising:
   a light source configured to emit a light beam;
   a deflector having an oscillation axis and configured to reflect the light beam emitted from the light source, while sinusoidally oscillating about the oscillation axis at a predetermined oscillation angle, to scan a region of a predetermined to-be-scanned surface from one end of the to-be-scanned surface to another end of the to-be-scanned surface with the light beam; and
   a scanning lens disposed between the deflector and the to-be-scanned surface and configured to cause the light beam to form an image on the to-be-scanned surface, wherein
   a surface shape of the scanning lens is formed so as to have:
      non-uniform-speed scanning characteristics in which a scanning speed with the light beam is the lowest at the one end and the other end of the to-be-scanned surface and is the highest at a midpoint between the one end and the other end; and
      image formation characteristics in which a beam diameter of the light beam is the largest at the one end and the other end of the to-be-scanned surface and is the smallest at the midpoint between the one end and the other end, and
   the non-uniform-speed scanning characteristics and the image formation characteristics are characteristics in which, when scanning is performed with the light beam for a predetermined unit time period at a position of each image height on a scanning line from the one end of the to-be-scanned surface to the other end of the to-be-scanned surface, a peak value of an intensity distribution of the light beam at each image height is made equal to each other by a combination of both characteristics.

2. The laser scanning unit according to claim 1, further comprising an aperture disposed between the light source and the deflector and having an opening which shapes the light beam emitted from the light source, wherein
   the opening of the aperture is set in such a shape that a light beam of a beam diameter with which the scanning lens exerts the non-uniform-speed scanning characteristics and the image formation characteristics is created on the to-be-scanned surface.

3. An image forming apparatus comprising:
   an image carrier configured to carry an electrostatic latent image; and
   the laser scanning unit according to claim 1, the laser scanning unit being configured to apply a light beam to a circumferential surface of the image carrier as the to-be-scanned surface.

4. The image forming apparatus according to claim 3, wherein the predetermined unit time period is a time period for which scanning is performed at the midpoint between the one end and the other end for a length corresponding to one pixel of the electrostatic latent image.

* * * * *